April 30, 1940. J. VISSER Re. 21,441

PANEL POCKET

Original Filed July 14, 1933

Inventor

John Visser

Witness:

Geo. L. Chapel

By Rice and Rice Attorneys

Reissued Apr. 30, 1940

Re. 21,441

UNITED STATES PATENT OFFICE 21,441

PANEL POCKET

John Visser, Grand Rapids, Mich., assignor, by mesne assignments, to Reconstruction Finance Corporation, Detroit, Mich., a corporation of the United States Original No. 1,999,970, dated April 30, 1935, Serial No. 680,409, July 14, 1933. Application for reissue October 23, 1936, Serial No. 107,284

10 Claims. (Cl. 206—19.5)

The present invention relates to panel pockets, and more particularly to swingably mounted containers disposed within panel or wall openings.

The main objects of the invention are to provide a novel type of ash receiver, vanity case, match box or the like adapted for mounting within openings on the instrument board or wall of a motor car; to provide such a device which is rattleproof when assembled; to provide such a device which may be economically manufactured; to provide such a device which may be conveniently installed; and, to provide such a device which is attractive in appearance and utilitarian in use.

The device herein shown and described is an improvement over the device of the Roedding Patent No. 1,589,230, issued June 15, 1926, to my assignee.

An illustrative embodiment of the instant invention is shown in the accompanying drawing, wherein.

Figure 1:
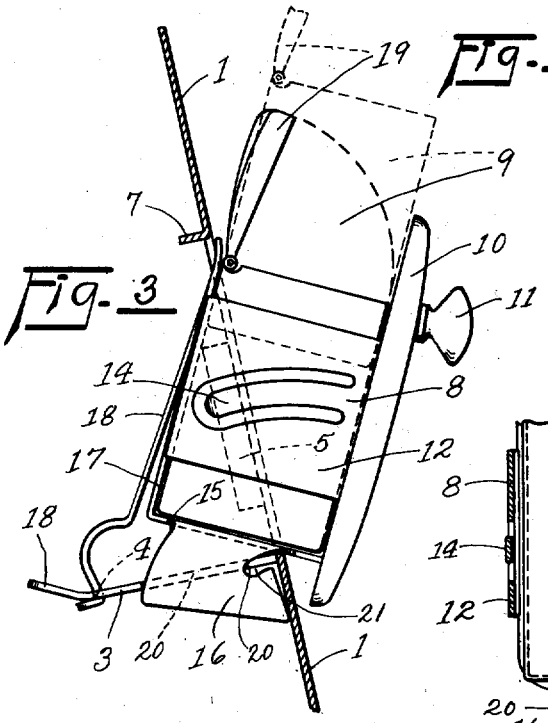
Figure 1 is a perspective view of the container mounted in an opening of a panel or wall.

Referring to the drawing in which like parts are designated by the same numerals in the several views, a panel or wall 1 such as a sheet metal instrument panel of a motor car or a wall thereof is provided with an opening 2 therein and here shown as generally rectangular in form. This opening in the panel is formed by a portion blanked or cut therefrom and turned inwardly to form a laterally projecting tongue 3 which is provided with a rectangular slot 4 and a pair of oppositely disposed notches 20 on each side thereof. The two opposite sides of the opening and the upper edge thereof are here shown provided with inwardly projecting flanges 5, 6, and 7 likewise blanked from the panel.

A receptacle of sheet metal or the like, generally designated 8, for detachably retaining and embracing a metal container 9 is provided with a face plate 10, preferably ornamental in character and having a handle or button 11, side walls 12 and 13, each here shown as provided with a spring tensioned finger 14 generally U-shaped in form and preferably blanked or cut therefrom, a bottom 15 having depending spaced cam members 16, each provided with an arcuate slot 21, and a rear wall 17 which is provided with a depending finger 18 preferably blanked or cut therefrom and adapted for engagement within the slot 4 when the receptacle is inserted within the panel opening as hereinafter described. The receptacle may, if desired, be in the form of a container per se but is here shown as adapted for embracingly retaining the detachably insertable container 9.

The receptacle 8 is generally rectangular in form and of a size adapting it for insertion within the panel opening 2. The depending cams 16 are disposed within the notches 20 and contact the inner side of the panel 1 to form fulcrum points thereagainst to permit swinging of the receptacle from the position shown in Figure 2 to the position shown in Figure 3. The spring tensioned fingers 14 blanked from the side walls 12, 13 frictionally engage the side edges of the panel opening 2 to prevent rattling and the depending finger 18 within the slot 4 limits the outward swinging movement of the receptacle. The arcuate slots 21 in the depending cams 16 are so shaped that when the receptacle is swung outwardly the lower edge of its face plate 10 is held in spaced relation to the panel as shown in Figure 3 to prevent marring of the panel in its opening and closing movement.

Figure 3:
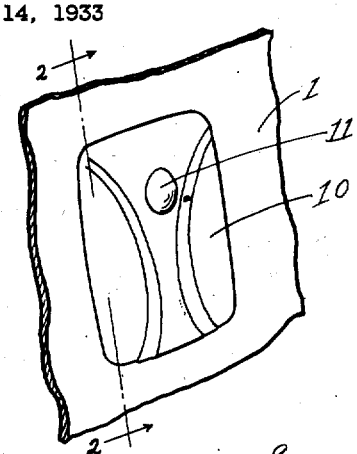
Figure 3 is a similar sectional view but showing the container swung to open position.
Figure 4:
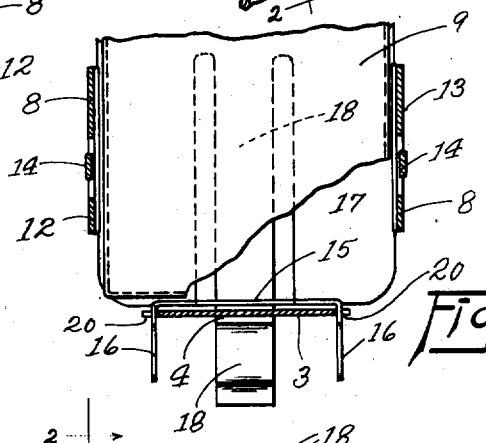
Figure 4 is a sectional view on line 4—4 of Figure 2, a portion of the rear wall of the container being broken away.
Figure 2:
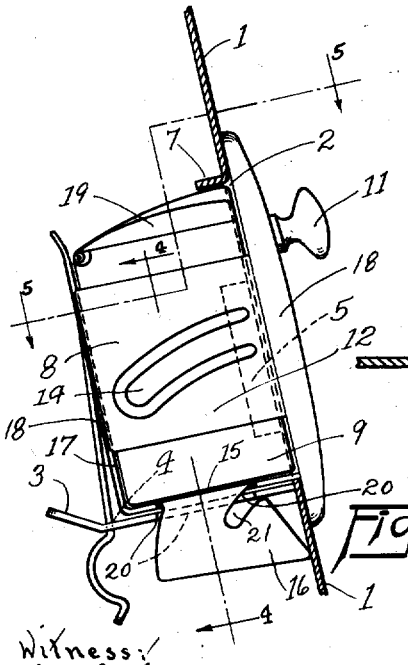
Figure 2 is a sectional view thereof on lines 2—2 of Figures 1 and 5.
Figure 5:
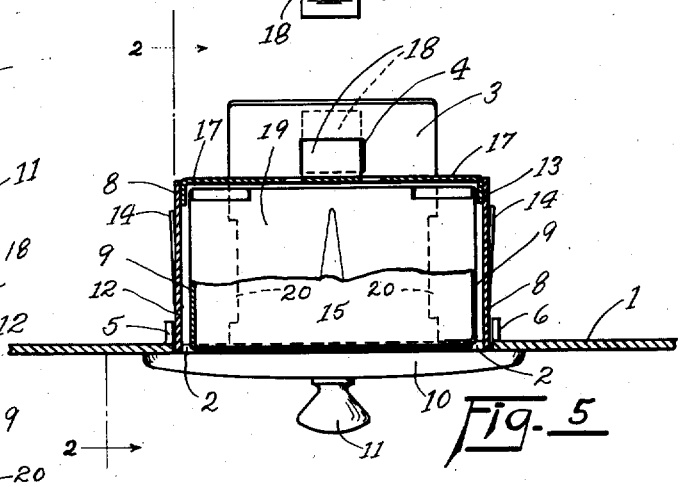
Figure 5 is a sectional view on line 5—5 of Figure 2, a portion of the top of the container being broken away.

The container 9 is, as heretofore suggested, preferably removable from the receptacle 8 as best indicated by dotted lines in Figure 3, and is provided with a hinged cover 19 which is adapted to swing open when the receptacle is swung outwardly and to swing closed by contact with the upper edge and flange 7 of the panel opening 2 when the receptacle is swung inwardly as shown in Figures 2 and 3.

It will thus be seen that a novel type of device of the character herein shown and described has been provided and that the device is economical to manufacture, may be conveniently installed, is rattle-proof when assembled, and is attractive in appearance and utilitarian in use.

While but one specific embodiment of this invention has been herein shown and described, it will be understood that numerous details of the construction shown may be altered or omitted without departing from the spirit of this invention as defined by the following claims.

I claim as my invention:

1. In a device of the class described, a panel provided with an opening therein formed by a portion blanked therefrom and turned inwardly to form a latterally projecting tongue, said tongue having a slot therein, and a container disposed within said opening having depending spaced cams forming fulcrum points contacting the inner side of the panel to permit swinging the container outwardly from said panel and a finger carried by said container engaging within said slot for limiting the outward swinging movement of the container.

2. In a device of the class described, a panel provided with an opening therein formed by a portion blanked therefrom and turned inwardly to form a laterally projecting tongue, said tongue having a slot therein, and a container frictionally disposed with said opening having depending spaced cams forming fulcrum points contacting the inner side of the panel to permit swinging of the container outwardly from said panel and a finger carried by said container engaging within said slot for limiting the outward swinging movement of the container.

3. In a container adapted for insertion within an opening in a panel formed by a portion blanked therefrom and turned inwardly to form a tongue, the tongue having a slot therein, said container being disposed within said opening and having depending spaced cams forming fulcrum points contacting the inner side of the panel to permit swinging the container outwardly from said panel with the lower edge of its face in spaced relation to the panel, and a finger carried by said container and engaging within said slot for limiting the outward swinging movement of the container.

4. In a device of the class described, a panel provided with an opening therein formed by a portion blanked therefrom and turned inwardly to form a latterally projecting tongue, said tongue having a slot therein and a pair of oppositely disposed notches adjacent each side thereof, and a container within said opening having depending spaced cams disposed within said oppositely disposed notches and forming fulcrum points contacting the inner side of the panel to permit swinging the container outwardly from said panel with the lower edge of its face in spaced relation to the panel, and a finger carried by said container engaging within said slot for limiting the outward swinging movement of the container.

5. In a device of the class described, a panel provided with an opening therein formed by a portion blanked therefrom and turned inwardly to form a laterally projecting tongue, said tongue having a slot therein and a pair of oppositely disposed notches adjacent each side thereof, and a container within said opening having depending spaced cams, each provided with an arcuate slot, said cams being disposed within said oppositely disposed notches and forming fulcrum points contacting the inner side of the panel to permit swinging the container outwardly from said panel with the lower edge of its face in spaced relation to the panel, and a finger carried by said container engaging within said slot for limiting the outward swinging movement of the container.

6. A device of the class described comprising a mounting member, a container, means for movably mounting said container on said mounting member including depending cam members and a supporting tongue member having sliding contact with each other, means for maintaining said container in mounted relation to said mounting member, said means including hook portions on said cam members engaging the underside of said tongue member, a flexible dorsal side on said container having the lateral parts thereof connected to the remainder of said structure and a central tongue part separated from said lateral parts by slots and thereby rendered unconnected at its sides from the remainder of said structure, and means for releasing said container for removal from said mounting member actuated by flexing said unconnected tongue part of said dorsal side.

7. A device of the class described comprising, a mounting member, a container, means for movably mounting said container on said mounting member including members having sliding contact with each other, means for maintaining said container in mounted relation to said mounting member, a flexible side of said container having a part connected and another part unconnected from the remainder of the structure forming a flexible part, and means for releasing said container for removal from said mounting member actuated by flexing said unconnected part of said side.

8. A panel with an opening, a swingable container mounted for tilting movement into and out of said opening, spring means for urging said container into cooperation with a bearing portion on said panel adjacent the lower part of the body of said container, said container having an upper end which is open for access when said container is tilted outwardly relative to said panel opening and stop means for limiting outward displacement of said container, said panel having an inwardly and rearwardly extending portion at the top of said opening and said container being provided with means for bearing against said portion to aid in maintaining an anti-rattle fit of the container with respect to said panel when said container is swung to a closed position.

9. In combination, a panel having an aperture, an ash container tiltably mounted for movement through said aperture and into concealed and exposed positions, supporting means for said container connected to said panel and a spring carried by said container for slidably embracing said supporting means under tension to aid in maintaining said container in cooperation therewith, said spring extending downwardly adjacent the bottom of said container and including a curved portion formed to slide relative to said supporting means upon movement of said container in a direction to move it out of said aperture.

10. In combination, a panel having an aperture, an ash container tiltably disposed in said aperture and having an opening in its top side adapted to be exposed to receive ashes when the container is tilted out of said aperture, said panel having a rearwardly extending top portion above the top of said container, means including a curved bearing and a surface in engagement therewith at the rear of the panel for tiltably supporting said container, and means at the top side of said container for engaging the under surface of said rearwardly extending portion for aiding in the holding said bearing and surface in engagement, said container having one of its sides provided with spring means for resisting said tilting movement and whereby said movement of the container is under tension.

JOHN VISSER.